Feb. 13, 1934.  E. L. FONSECA  1,946,679
THERMOSTATIC FUEL CONTROL DEVICE
Filed Feb. 17, 1930
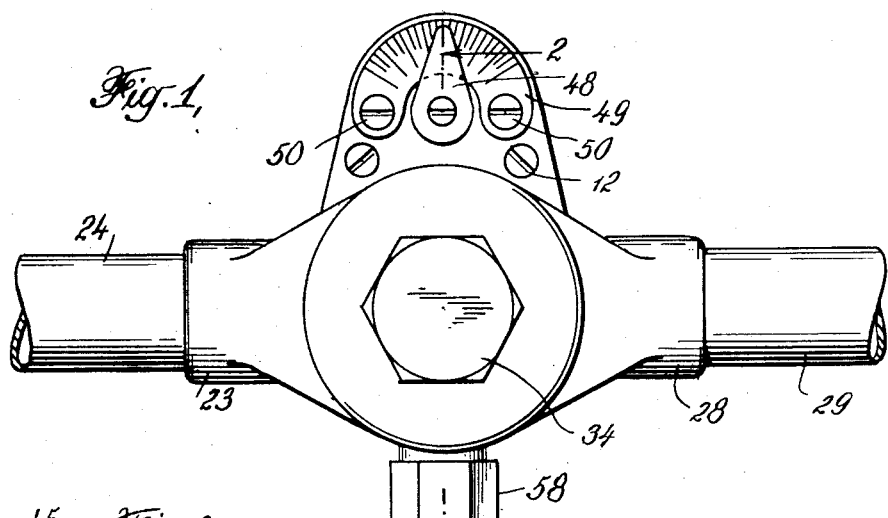
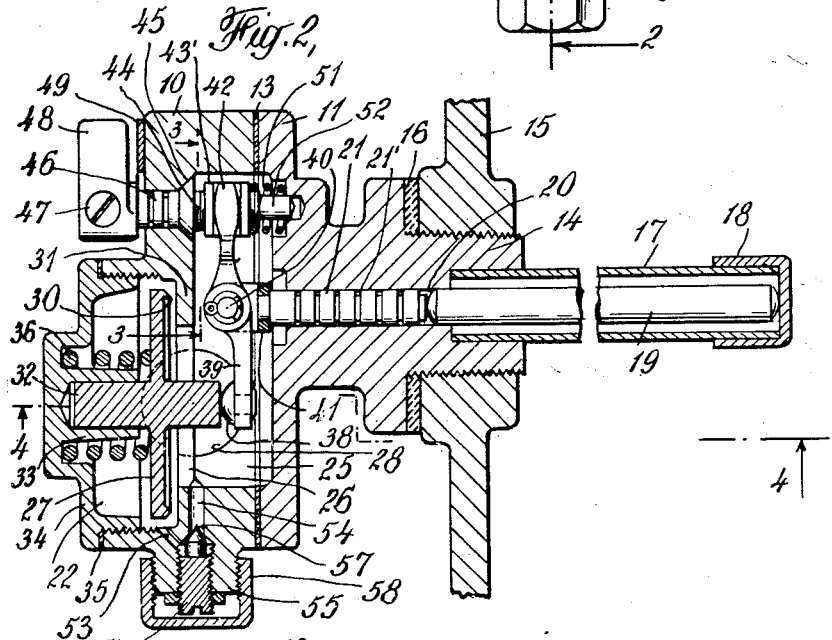
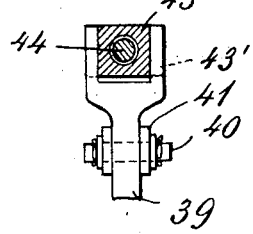
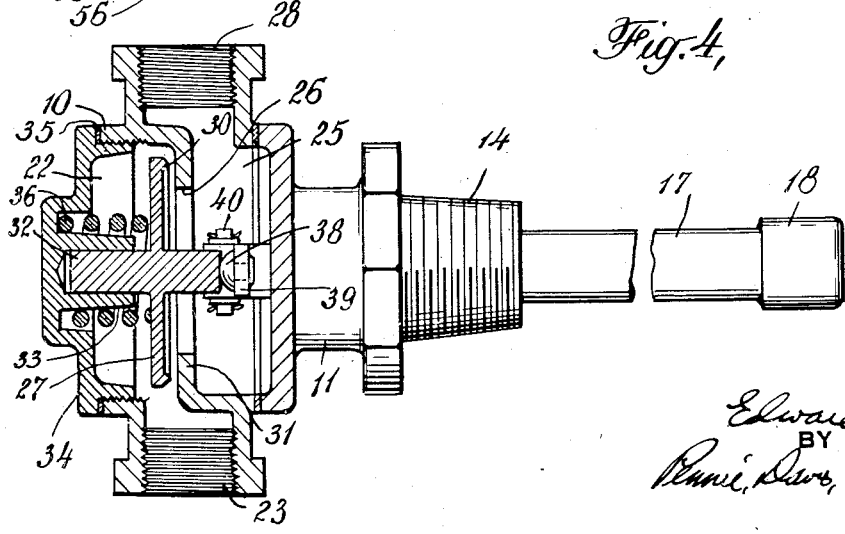
INVENTOR
Edward L. Fonseca
BY
ATTORNEYS Patented Feb. 13, 1934

1,946,679

UNITED STATES PATENT OFFICE 1,946,679

THERMOSTATIC FUEL CONTROL DEVICE

Edward L. Fonseca, Newark, N. J., assignor to The Wilcolator Company, Newark, N. J., a corporation of Delaware Application February 17, 1930. Serial No. 429,082

5 Claims. (Cl. 236—102)

This invention relates to thermostatic fuel control devices, and has particular reference to thermostatic devices of the type adapted for use in connection with gas-burning water heaters in which the supply of gas to the water heating burner is controlled by the thermostatic device in accordance with variations in temperature of the water.

The principal object of this invention is to provide a thermostatic device of the type described which is provided with a sensitive and accurate manual adjustment for the thermostat whereby the latter automatically regulates the supply of fuel to the burner for maintaining the water at any predetermined temperature.

A further object of this invention is to provide a device of the type described which is simple in construction and in which the gas chambers are sealed against leakages of any kind, and especially against the inevitable condensation of moisture in parts of the device, which, if allowed to enter the gas chambers, affects the proper operation of the gas burner.

These and other objects of this invention are obtained in a preferred embodiment thereof in which an expansible tube, adapted to be inserted in the water tank or the like, actuates a non-expansible rod having a connection with a lever of the third class, one end of which operates a gas supply valve, and the other end of which serves as the fulcrum which preferably takes the form of a nut in which a pin is threaded, this pin having a handle pointer ranging over a graduated scale whereby any desired water temperature may be preregistered. The lever compounds the movement of the adjusting means and the valve, so that a very sensitive and accurate adjustment is provided, whereby the water temperatures may be controlled within a very narrow range. The lever is arranged in one of the gas chambers, but the non-expansible rod of the thermostat which is operatively connected to the lever is sealed from this chamber by a packing gland which prevents the condensed moisture in the tube of the thermostat from entering the gas chambers.

For a better understanding of the invention, reference is made to the accompanying drawing, in which Figure 1 is a face view of the device;

Fig. 2 is a longitudinal section thereof taken along the line 2—2 of Fig. 1;

Fig. 3 is a detail of the adjusting lever fulcrum as seen along the line 3—3 of Fig. 2; and Fig. 4 is a cross-section of the valve chamber as seen along the line 4—4 of Fig. 2.

In the drawing, numerals 10 and 11 designate the two parts of the body of the thermostatic control device of this invention, these two parts being joined by screws 12 and sealed together gas-tightly by means of gasket 13. As shown particularly in Fig. 2, part 11 of the valve body is provided with a threaded collar 14, which is adapted to be screwed into the wall of a water heater tank or the like 15 over a gasket 16. Soldered or otherwise secured in the collar 14 of body part 11 is the heat responsive means 17, which preferably takes the form of an elongated tube of metal having a high coefficient of thermal expansion, this tube being closed at the end by means of a cap 18, which is preferably soldered water-tightly in place, and which is adapted to extend into the water in tank 15.

Mounted within this expansible tube 17 is a relatively non-expansible element 19, which preferably takes the form of a metal rod abutting at the outer end against cap 18 and slidably mounted at the inner end in a passage 20, formed in body part 11. This inner end of thermostat rod 19 abuts a plug 21, also slidably mounted in passage 20 of body part 11. The plug 21 fits closely in passage 20 and is shaped with a plurality of grooves 21' which provide a form of labyrinth packing and seal the gas chambers from the interior of thermostat tube 17, whereby no gas can enter tube 17, nor can any condensed moisture enter the gas chambers from tube 17.

The part 10 of the valve body is provided with two chambers. The valve or gas intake chamber 22 is in communication with the intake port 23, which is connected to gas supply line 24. This gas intake chamber 22 communicates with gas outlet chamber 25 through orifice 26, which is normally closed by the valve 27. The gas outlet chamber 25 is in communication with the outlet port 28 from which gas flows through pipe 29 to the remote burner, not shown, which is adapted for heating the water contained in tank 15.

The valve 27 is of the disc type provided with a knife edge flange 30 adapted to seat gas-tightly against the flange 31 formed between gas chambers 22 and 25. The outer end of the stem 32 of the valve 27 is piloted in a socket formed by a ring 33 on the interior surface of a cap 34, which is screwed over gasket 35 into the flange of valve chamber 22, as shown particularly in Fig. 2. Seated against the disc of valve 27 and against the interior surface of cap 34, is a coil spring 36, which normally constrains valve 27 against body flange 31 to closed position.

The inner end of the stem 32 of valve 27 bears against a button 38 secured on the end of lever 39, which is of the third class. Approximately the center of the lever is pivoted upon pin 40 mounted in a U-shaped clevis 41, secured to the free end of packing plug 21. The opposite end 42 of lever 39 is formed with a square, fork-shaped yoke shown particularly in Fig. 3, which embraces a square nut 43 through which is threaded an adjusting screw 44. The opposite sides of the lever yoke 42 are rounded so as to roll or rock on the flanges 43' of the nut 43 when the lever 39 is turned. The screw 44 is provided with a conical flange 45 at one side, which fits gas-tightly in a conical seat formed in body part 10, and with a packing plug 46 journalled in body part 10 and having a projection extending outside of the body part 10. To this projection of screw 44 is secured by means of set screw 47 an adjusting pointer 48. This adjusting pointer 48 is adapted to be moved manually over a scale 49 mounted by screws 50 to the outside surface of body part 10, this scale being graduated in degrees of water temperature or the like, one end of the scale 49 being inscribed with "C" to indicate cold, and the other end of the scale being inscribed with "H" to indicate hot. It will be seen that turning movement of the adjusting pointer 48 and connected screw 44 causes axial movement of the square nut 43 along screw 44, which serves as the fulcrum for the lever 39, the force being applied to this lever 39 at pin 40 by the thermostat 17—19, this force being multiplied by the lever 39 to move valve 27 a proportionately greater distance. The conical flange 45 of adjusting screw 44 is held in place in its conical seat and the entire adjusting device is held rigid by means of a coil spring 51 which encircles the opposite end 52 of screw 44, this end being piloted in a socket formed in body part 11, as shown in Fig. 2.

For providing a minimum supply of gas to the burner to prevent extinguishment thereof when valve 27 is closed, a by-pass between gas chambers 22 and 25 is provided. This by-pass preferably takes the form of a hole 53 drilled from chamber 22 and intersecting a similar hole 54 drilled from chamber 25. Threaded in a boss 55 formed on the outside surface of body part 10, is a set screw 56 provided with a needle valve 57 adapted to seat in hole 54 to close the same. By manually screwing set screw 56 inwardly or outwardly, the minimum supply of gas through the by-pass 53—54 may be regulated. In order to seal this by-pass 56—57, and to prevent tampering with the needle valve 57, a cap 58 is threaded over boss 55, as shown particularly in Figs. 1 and 2.

In operation, the user manipulates adjusting pointer 48 so that it designates the temperature at which the water contained in tank 45 is to be maintained. Assuming that the temperature of the water in tank 15 is less than that designated by pointer 48, the contracted condition of heat responsive tube 17 projecting into the water in tank 15, causes it to place rod 19 in an inwardly projected position so that lever 39 lies in a position about its adjusted fulcrum 43 so that valve 27 is opened as shown in Fig. 2, for example. Gas flows from supply pipe 24 and intake orifice 23 into valve chamber 22, through open valve orifice 26 into outlet chamber 25, and from chamber 25 through outlet orifice 28, pipe 29, to the burner. The burner heats the water in or flowing into tank 15 until the temperature thereof rises to that preregistered upon dial 49 by means of the adjusting pointer 48. During this temperature rise thermo-responsive tube 17 gradually expands and retracts rod 19 so that lever 39 is moved about its fulcrum 43 to allow spring 36 to gradually close valve 27 until it is completely closed, when the water in tank 15 reaches the predetermined temperature registered upon dial 49 by means of handle pointer 48. If by-pass needle valve 57 has been set to allow a small quantity of gas to flow through it, the flame of the burner will not be extinguished when valve 27 is automatically closed, but will merely be turned down in condition to be relighted when valve 27 is again automatically opened by the contraction of thermo-responsive tube 17 in response to a drop in the water temperature, so that lever 39 is moved about its fulcrum 43 to open valve 27, when the temperature of the water in tank 15 falls below that registered on dial 49.

If it is desired to maintain the temperature of the water in tank 15 at a lower temperature, the user moves the adjusting pointer 48 toward the inscription "C" until it designates the desired temperature on scale 49. This movement of adjusting pointer 48 causes the regulating screw 44 to be threaded in the fulcrum 43, thereby moving the latter outwardly and causing lever 39 to turn slightly about pin 40. With the parts in this position, a relatively greater closing movement of the valve 27 will take place, i. e., the valve will be closed at a lower water temperature than when the adjusting pointer 48 is moved in the opposite direction to thread the regulating screw 44 out of the fulcrum nut 43.

Because the valve 27 is housed beneath cap 34 and is held in place thereby, and is not secured to lever 39, the valve 27 may be readily emplaced or removed without disturbing the adjustment of the thermostatic regulating means. Also, the temperature adjusting mechanism may be readily emplaced and removed because it fits relatively loosely in body part 10, being held in place by the pointer handle 48 on one end and the spring 51 on the other end. In a similar way, lever 39 is not positively attached to either the valve 27 or the adjusting means, so that it may be slipped off of fulcrum nut 43, and the attached packing plug 21 may be readily withdrawn from passage 20 in body part 10.

It will be seen that the new thermostatic fuel control device of this invention offers many important advantages, among which are compactness, simplicity, facility of manufacture and assembly, and accuracy and sensitivity of operation and control because of the arrangement of the lever 39 which multiplies both the adjustment movement made by adjusting handle 48 and the movement of the regulating thermostat 17—19. Furthermore, the provision of the packing plug 21 between gas chamber 25 and the interior of the thermo-responsive tube 17 prevents the leakage of gas into the tube 17 and the leakage of condensed moisture from tube 17 into passage 25.

While the new thermostatic fuel control device of this invention has been described as being particularly adapted for water heaters, it is to be understood that the device is not limited to use in water heaters, but is susceptible of use in any other apparatus wherein it is sought to maintain the temperature automatically to any selected predetermined degree.

I claim:

1. In a thermostatic valve, the combination of a valve body having inlet and outlet chambers, a valve controlling communication between said chambers, a thermostatic device connected to said valve body and displaced axially from said valve, a lever operatively connecting said thermostatic device and said valve, an adjusting screw journalled in said body and displaced axially from said valve and thermostatic device, a nut mounted upon said screw, a movable connection beween said lever and said nut and serving as a fulcrum for said lever, and means outside of said body connected to said screw for adjusting the same to move the fulcrum of said lever.

2. In a thermostatic valve, the combination of a valve body having inlet and outlet chambers, a valve controlling communication between said chambers, a thermostatic device connected to said valve body and displaced axially from said valve, a lever operatively connecting said thermostatic device and said valve, an adjusting screw journalled in said body and displaced axially from said valve and thermostatic device, a non-rotatable screw connection between said lever and said screw permitting endwise movement of said lever and adapted to serve as a fulcrum for the lever, means for adjusting the relation between said screw and said connection, and a packing pin interposed between said thermostatic device and said lever for sealing the interior of said body from said device.

3. In a thermostatic device having a lever-controlled valve, the combination of a valve body, an expansible member carried by said body, a relatively non-expansible member carried by said expansible member, a pin slidable in said body and adapted to abut said non-expansible member and the valve lever, a screw journalled in said valve body and displaced axially from said valve and pin, a screw connection between said lever and said screw, adapted to serve as a fulcrum for said lever and permitting endwise movement of said lever, means for adjusting said screw to adjust the fulcrum of said lever, and means for resiliently forcing said pin against said non-expansible member.

4. In a thermostatic device having a lever-controlled valve, the combination of a valve body, an expansible member carried by said body, a relatively non-expansible member carried by said expansible member, a pin slidable in said body and adapted to abut said non-expansible member and the valve lever, a screw journalled in said valve body and displaced axially from said valve and pin, a nut mounted in said screw, a rocking connection between said nut and the lever adapted to serve as a fulcrum for said lever, an adjusting handle connected to said screw for moving the nut therealong and thereby adjusting the fulcrum of the lever, and a scale and pointer combination cooperating with said adjusting handle.

5. A thermostatic valve comprising, a valve, a thermostatic element axially parallel but not in alignment therewith, a lever operatively connected to said valve at one end, to said thermostatic element between the ends, and to a fulcrum at the other end of said lever comprising a member to which said lever is pivoted, and a rotatable but axially fixed screw passing through said member and serving to adjust the position thereof, said screw being axially parallel to said valve.

EDWARD L. FONSECA.